(12) United States Patent
Stoltz et al.

(10) Patent No.: US 10,302,103 B2
(45) Date of Patent: May 28, 2019

(54) METHOD AND DEVICE FOR INDICATION OF THE POSITION OF HYDRAULICALLY ACTUATED ARMATURES

(71) Applicant: PLEIGER MASCHINENBAU GMBH & CO. KG, Witten (DE)

(72) Inventors: Ingo Stoltz, Gelsenkirchen (DE); Heinrich Plaas, Lunen (DE)

(73) Assignee: PLEIGER MASCHINENBAU GMBH & CO. KG, Witten (DE)

( * ) Notice: Subject to any disclaimer, the term of this patent is extended or adjusted under 35 U.S.C. 154(b) by 952 days.

(21) Appl. No.: 14/649,412

(22) PCT Filed: Nov. 11, 2013

(86) PCT No.: PCT/EP2013/073475
§ 371 (c)(1),
(2) Date: Jun. 3, 2015

(87) PCT Pub. No.: WO2014/086554
PCT Pub. Date: Jun. 12, 2014

(65) Prior Publication Data
US 2015/0369265 A1    Dec. 24, 2015

(30) Foreign Application Priority Data

Dec. 3, 2012   (DE) .......................... 10 2012 222 074

(51) Int. Cl.
*F15B 11/12* (2006.01)
*F15B 15/28* (2006.01)
(Continued)

(52) U.S. Cl.
CPC .............. *F15B 15/28* (2013.01); *F15B 11/12* (2013.01); *F15B 11/126* (2013.01);
(Continued)

(58) Field of Classification Search
CPC ...... F15B 15/2838; F15B 21/02; F15B 11/12; F15B 11/126; F15B 19/002; F15B 15/28; G01F 22/00
See application file for complete search history.

(56) References Cited

U.S. PATENT DOCUMENTS

| 3,081,942 A * | 3/1963 | Maclay ..................... F15C 4/00 137/599.04 |
| 8,939,061 B2 * | 1/2015 | Middelanis ......... F15B 15/2838 91/1 |

FOREIGN PATENT DOCUMENTS

| DE | 2759263 C3 | 7/1979 | |
| DE | 19628221 A1 * | 4/1998 | .............. F15B 15/28 |

(Continued)

*Primary Examiner* — Michael Leslie
*Assistant Examiner* — Abiy Teka
(74) *Attorney, Agent, or Firm* — Horst M. Kasper, Esq

(57) ABSTRACT

The invention relates to a method for indicating the position of a hydraulically actuated armature, having a piston (1.21) in a cylinder (1.2) for actuating the armature (1.1), which cylinder is connected by means of two hydraulic lines (2, 3) to a switch valve (7) through which the hydraulic lines can be switched between pressure-conducting feed flow and pressureless return flow, wherein the flow of the hydraulic fluid flowing through one of the hydraulic lines is converted into a number of electric pulses, each of which corresponds to a pre-determined unit of volume of the hydraulic fluid, the switch valve (7) is connected to supply lines (P, T), to which further switch valves (7) are connected for actuating further armatures (1.*n*), the switch valves (7) are connected via a branch line (T1) to the return line (T) common to all armatures, and wherein at each switch valve (7) in the branch line (T1) to the return line (T), a preload pressure is maintained which is higher than the pressure in the common return line (T).

(Continued)

Figure 1:
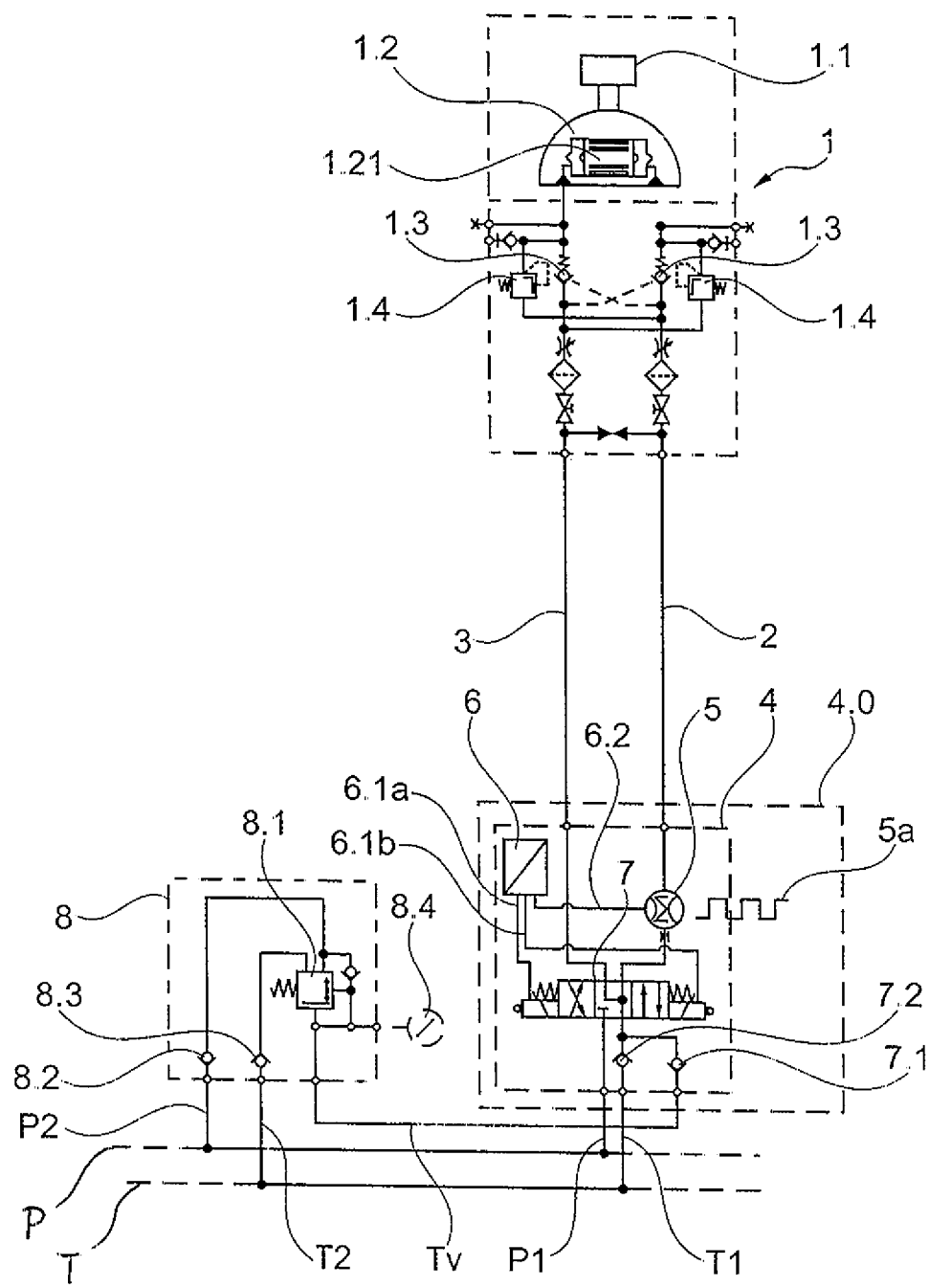

Furthermore, a program is provided which processes the pulses of the throughflow sensor and carries out a learning cycle.

5 Claims, 4 Drawing Sheets

(51) Int. Cl.
*F15B 19/00* (2006.01)
*F15B 21/02* (2006.01)
*G01F 22/00* (2006.01)
*F15B 21/04* (2006.01)

(52) U.S. Cl.
CPC ........ *F15B 15/2838* (2013.01); *F15B 19/002* (2013.01); *F15B 21/02* (2013.01); *G01F 22/00* (2013.01); *F15B 21/04* (2013.01); *F15B 2211/50554* (2013.01); *F15B 2211/5157* (2013.01); *F15B 2211/6326* (2013.01)

(56) References Cited

FOREIGN PATENT DOCUMENTS

| DE | 10 2009 023 168 A1 | 12/2010 |
|---|---|---|
| GB | 1275844 A | 5/1972 |
| WO | WO 2009/033553 A1 | 3/2009 |

\* cited by examiner

METHOD AND DEVICE FOR INDICATION OF THE POSITION OF HYDRAULICALLY ACTUATED ARMATURES

The invention relates to a method and a device for detecting the position of hydraulically actuated armatures which, from a central control station, are displaced by means of hydraulic lines.

The indication of the position of such hydraulically actuated armatures, such as swivel and linear drives, is performed via the displacement volume of the armature. For example, on a tank ship an armature can be arranged at a distance of up to 300 m from the switch valve in the central control station. For such long lines, in the case of smaller armatures, the compressibility of the hydraulic liquid in the lines corresponds partly to the displacement volume of the armature. Therefore, an exact indication of the position of the armature concerned is not possible without compensation of the compressibility of the hydraulic liquid in the pipeline system.

From WO 2009/033553 A1, a method is known in which the flow of the hydraulic liquid through the hydraulic line is converted by means of a throughflow sensor into a number of electric pulses, each of which pulse corresponds to a pre-determined unit of volume of the hydraulic liquid. For the indication of the position of the armature, the compressibility of the hydraulic liquid is compensated in that the compression volume of the hydraulic liquid is converted into a number of electric pulses which are processed in an indication means such that they are taken into account for the indication of the position of the armature.

In the central control station on a tank ship, a large number of switch valves is present for a corresponding number of armatures which are all connected to common supply lines. When a switch is performed at a switch valve between feed line and return line for displacing the armature, pressure pulses occur in the supply lines, which can have a disadvantageous effect on the adjacent switch valves and thus on the indication of the position of the armatures connected thereto.

Furthermore, the position indicator always has to indicate the position of the armature exactly, over a long time period and even after a large number of switching procedures.

It is the object of the invention to improve the known indication of position on the basis of the counting of pulses in such a way that these problems are overcome and the indication of position is more exact.

The object of the invention is achieved by a method according to claim 1 and a device according to claim 4.

In this way, the return line of each individual armature at the switch valve is maintained under a pre-determined preload pressure when switching is performed from the pressure-conducting feed line to the substantially "pressureless" return line and the feed line is depressurized.

In this way, pressure pulses which result through switching procedures at one switch valve, or at a plurality of switch valves, are compensated and damped by the preload pressure in the return line connected to the armature, in such a way that these pressure pulses do not affect the pulse counters at other adjusting means in a manner disadvantageous to the indication of the position of the other armatures.

Furthermore, the object of the invention by a method according to claims 1-3 and a device is achieved according to claims 4-5.

In this way, a program which processes the pulses supplied from the throughflow sensor and carries out the indication of position preferably carries out a learning cycle during each start-up, by means of which it is ensured that the indication of position takes into account the real conditions, independently of whether an end position or an intermediate position of the armature is reached.

According to the first aspect of the invention, in the case of a method for indicating the position of a hydraulically actuated armature having a piston in a cylinder for actuating the armature, which is connected by means of two hydraulic lines to a switch valve through which the hydraulic lines can be switched between pressure-conducting feed and pressureless return, wherein the flow of the hydraulic liquid flowing through one of the hydraulic lines is converted into a number of electric pulses, each of which corresponds to a pre-determined unit of volume of the hydraulic liquid, wherein the switch valve is connected to supply lines to which further switch valves are connected for actuating further armatures, and wherein the switch valves are connected via a branch line to the return line common to all armatures, at each switch valve in the branch line to the return line, a preload pressure is maintained higher than the pressure in the common return line.

In this way, pressure pulses during switching at one of the switch valves cannot have a disadvantageous effect on pulse counters at adjacent other switch valves.

In an advantageous manner, by means of a hydraulic means connected to the two supply lines, the preload pressure is maintained in a portion of line to which all the switch valves are connected.

The preload pressure can be advantageously set to approximately 3 to 5 bar in the portion of line leading to the switch valves.

In a device for indicating the position of a plurality of hydraulically actuated armatures, each having a cylinder for actuating the armature, which is connected by means of two hydraulic lines to a switch valve through which the hydraulic lines can be switched between pressure-conducting feed and pressureless return, and a sensor is provided in one of the two hydraulic lines, which converts the flow of hydraulic liquid through the hydraulic line into a number of electric pulses, each of which corresponds to a pre-determined unit of volume of the hydraulic liquid, according to the invention a hydraulic means is connected to the fluid supply lines common to all switch valves, and in a separate portion of line a preload pressure is maintained in relation to the pressure in the common return line, wherein all the switch valves are connected to this portion of line so that the preload pressure acts on all switch valves.

According to the second aspect of the invention, in the case of a method for indicating the position of a hydraulically actuated armature having a cylinder for actuating the armature, which is connected by means of two hydraulic lines to a switch valve through which the hydraulic lines can be switched between pressure-conducting feed and pressureless return, wherein the flow of the hydraulic fluid flowing through one of the hydraulic lines is converted into a number of electric pulses, each of which corresponds to a pre-determined unit of volume of the hydraulic fluid, the following steps are provided:

displacing the piston in the cylinder from a first position into a second position by pressure application of the one hydraulic line in which the pulse counting is carried out, depressurisation of the hydraulic fluid in the cylinder in the second position and at the same time measuring the number of pulses corresponding to the compression volume, and returning the piston in the cylinder to the first position by pressure application on the opposite side of the cylinder and at the same time measuring the number of pulses between the first and the second position, which corresponds to the displacement volume of the cylinder.

In this way, exactly the compression volume can be measured which has to be considered when indicating the position of the piston in the cylinder.

Preferably, an end position of the piston in the cylinder and in the armature is selected as the second position, in which the armature abuts at a stop and the maximum pressure of the hydraulic fluid acts on the cylinder. In this way, a reliable position is given for the measurement.

The second position can be selected to be an intermediate position of the piston in the cylinder and the armature, in which a smaller pressure than the maximum pressure acts on the cylinder in order to carry out a measurement from an intermediate position.

It is advantageous to select the first position as an end position of the piston in the cylinder and in the armature in which the armature abuts at a stop, so that a fixed reference point is given.

To detect the compression volume in an end position of the piston in the cylinder, the armature is moved from a position of closed armature in which the maximum pressure is acting, into the position of maximum opening of the armature, and the number of pulses detected by means of the throughflow sensor arranged in the feed line is counted, which corresponds to the displacement volume of the armature and to the compression volume at maximum pressure in the feed line, whereupon the feed line is depressurised and the number of pulses occurring thereby is detected, which corresponds to the compression volume. After that, the piston in the cylinder is returned to the closed position of the armature and the number of pulses of the amount of fluid flowing through the return line is measured, which corresponds to the displacement volume of the cylinder and of the armature.

In this way, the compression of the hydraulic liquid at maximum pressure can be compensated during the indication of position.

To detect the compression volume in an intermediate position of the armature, the piston in the cylinder is moved from a position of the closed armature into an intermediate position by pressure application of the hydraulic line in which the throughflow sensor is arranged, wherein the measured number of pulses corresponds to the displacement volume in the intermediate position and to the compression volume at a smaller pressure, whereupon the pressure-conducting line is depressurised and the number of pulses occurring thereby is detected, which corresponds to the compression volume in the selected intermediate position.

Hereupon, by pressure application of the cylinder on the opposite side, the armature is returned to the closed position, while the pulses occurring thereby are counted, which correspond to the displacement volume in the selected intermediate position, wherein these measured values are also used for other intermediate positions than the measured intermediate position for the indication of position, so that in regard of different intermediate positions, reliable measured values of the compression volume are available for the indication of position.

It is of advantage if both of the hydraulic lines are depressurised before each pressure application of one of the hydraulic lines, in order to avoid lack of exactness in the pressure build-up.

Advantageously, from the compression volume detected for an intermediate position, the number of pulses is detected which corresponds to a pre-given adjustment travel of the piston in the cylinder in an intermediate position, so that for any random intermediate position between 0 and 100% it is possible to calculate the compression volume occurring thereby.

Advantageously, a learning cycle which carries out the method steps for detecting the displacement volume and the compression volume in the different positions of the armature is carried out during every start-up, before the armature is positioned in the required position.

An electronic control module is provided which can be connected at the switch valve and at the throughflow sensor and contains a program which carries out a learning cycle for detecting the parameters for the indication of position. Such a control module can be mounted in a compact constructional form at a switch valve for an armature.

Figure 2:
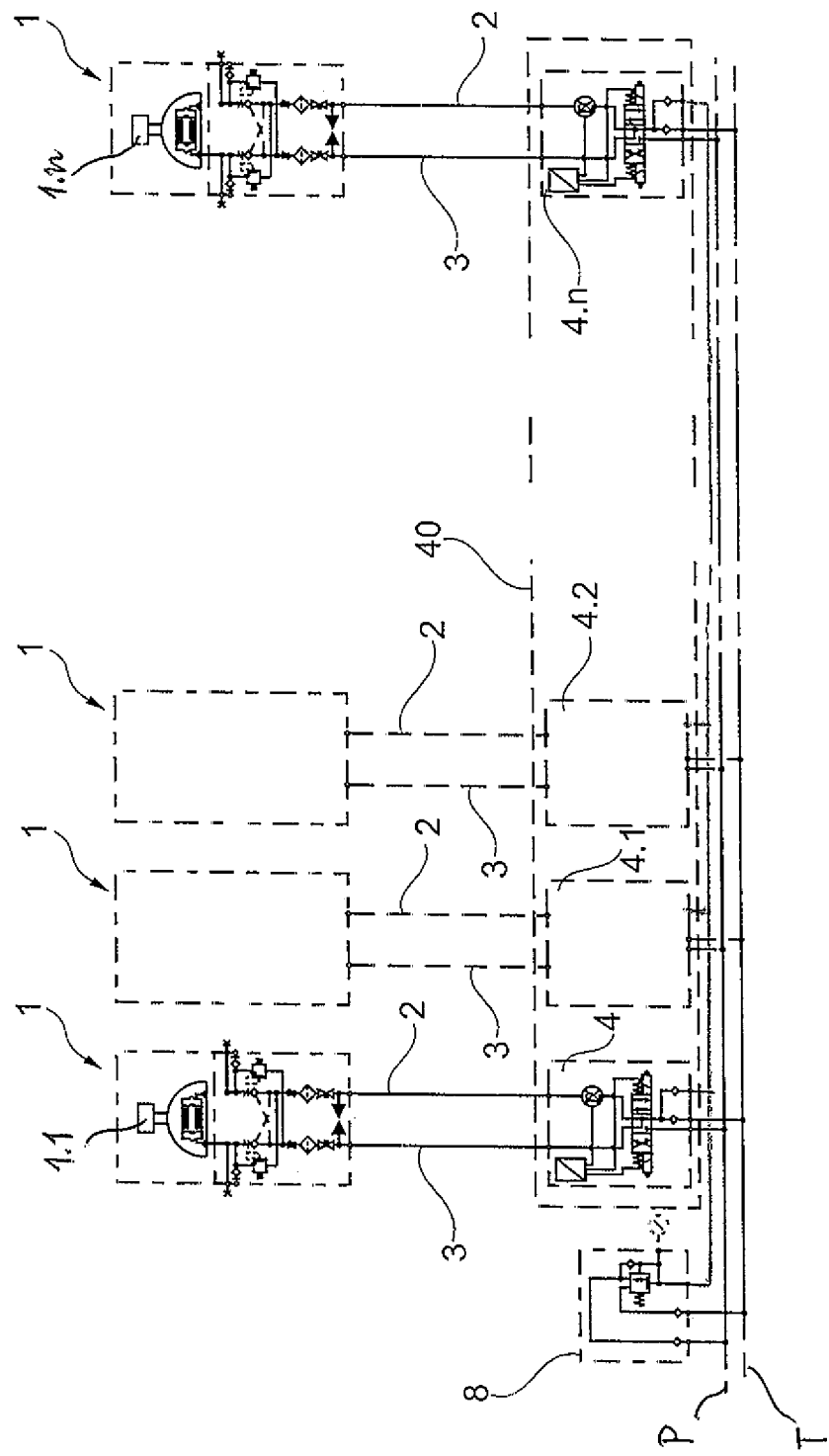
Figure 3:
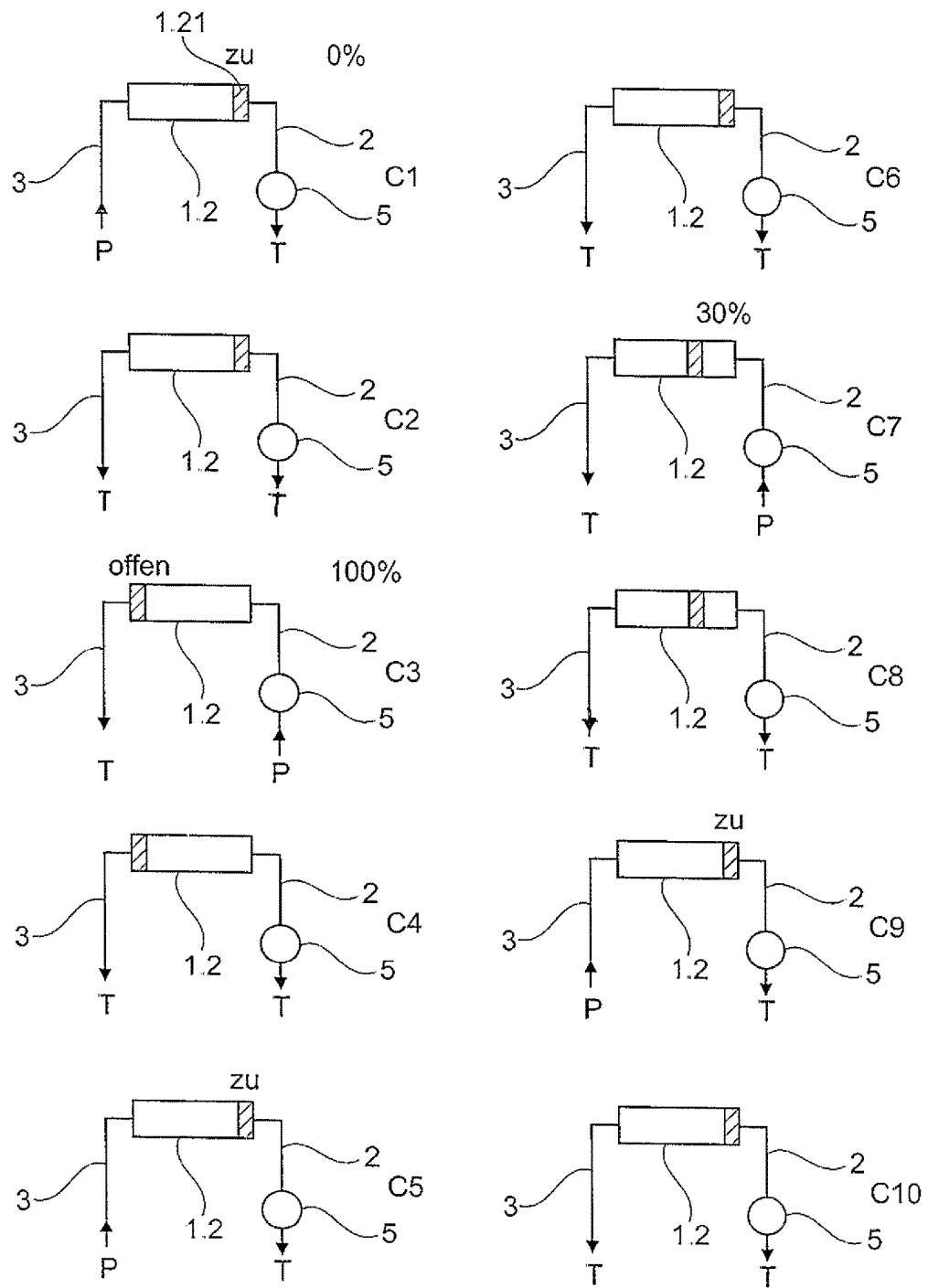
Figure 4:
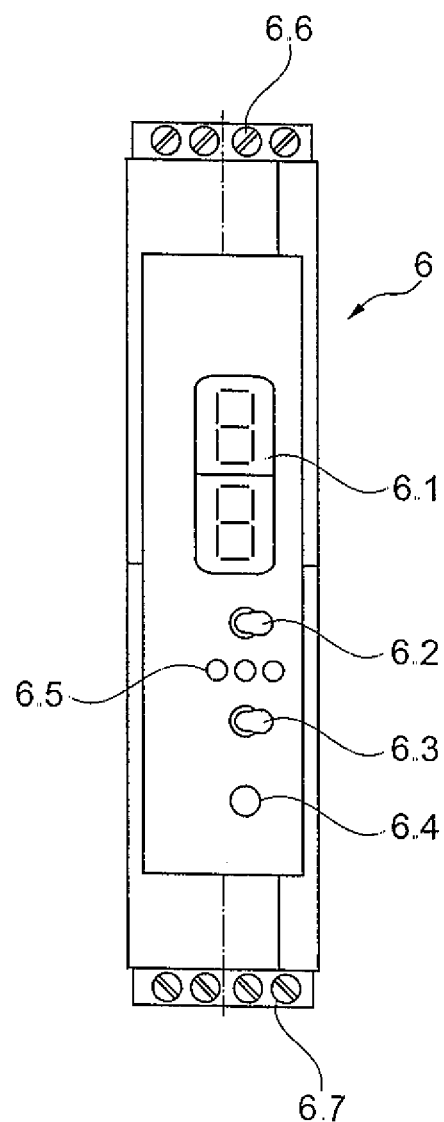

An exemplary embodiment of the invention is described in detail with reference to the drawing, in which FIG. 1 shows the circuit configuration having an electronic control module at a single armature, FIG. 2 schematically shows the hydraulic circuit of a plurality of switch valves adjacent to each other in a central control station, FIG. 3 shows, by means of schematic representations of the piston in the cylinder of an armature, the sequence of method steps in a learning cycle, and FIG. 4 shows a view of a block-shaped construction of a control module.

In FIG. 1, reference sign 1 designates an armature unit which comprises, for example, a pivoted flap 1.1 arranged in a conduit (not shown) which is displaced, for example, by means of a toothed rod through a piston 1.21 in a cylinder 1.2 which is connected on opposite sides to hydraulic or pressure medium lines 2 and 3. Return valves 1.3 for holding a set position of the piston 1.21 in the cylinder 1.2, and pressure limiting valves 1.4 in a per se known circuit, are arranged in the armature unit 1.

At reference sign 4 in FIG. 1, a control unit is schematically represented which is arranged in a central control station 40, from where the armature unit 1 is controlled, which can be positioned at a large distance from the control station 40. To simplify the representation, in FIG. 1, only an armature unit 1 having a control unit 4 is shown. As FIG. 2 shows, a plurality of control units 4.1 to 4.n for controlling a large number of armatures is arranged in the central control station 40, for example at the control desk of a tank ship.

In each control unit 4, a per se known adjust or switch valve 7 is arranged, by means of which hydraulic pressure is applied to the one or other side of the piston 1.21 in the cylinder 1.2, while in each case the other hydraulic line 2 or 3 is switched to be a return line. The switch valve 7 is connected to supply lines P and T. P designates the pressure-conducting supply line connected to a pressure source (not shown), usually a pump, and T designates the pressureless return line which leads to a tank or reservoir (not shown) for the hydraulic fluid or the hydraulic liquid. The switch valve 7 is connected to the pressureless return line T via a branch line T1, and to the pressure-conducting feed line P via a branch line P1.

Preferably in the area of the control station 40 and near the switch valve 7, a digital volume measuring device on a throughflow sensor 5 is arranged in one of the two hydraulic lines 2 or 3, which converts the flow of the fluid flowing through the line into a series of electric pulses. The throughflow sensor 5 can for example have a wheel driven by the fluid flow, which generates electric pulses in a contact-free manner via Hall sensors. Such throughflow sensors or throughflow counters 5 are known per se. The signals output from the throughflow counter 5 can for example be rectangular signals, as represented schematically at 5*a* in FIG. 1, wherein a pulse corresponds to a pre-given unit of volume of the fluid. A pulse can hereby correspond to a unit of volume of, for example, 0.05 cm$^3$ of the fluid flowing through the line.

At reference sign 6, a control module in the control unit 4 is schematically represented, which is connected via first electric lines 6.1*a* and 6.1*b* at a and b to the opposite sides of the switch valve 7, which is formed as a 3-way valve and is switched into the one or other position, in each case by means of a solenoid at a and b. Furthermore, the control module 6 is connected to the digital volume measuring device 5 via a second electric line 6.2, through which different electric pulses corresponding to the throughflow direction of the hydraulic fluid are transmitted to the control module 6 and to a program provided therein, in which the signals and numbers of pulses are processed.

The digital control module 6 is used to control the armature with analogue position feedback. The digital throughflow counter 5 has two binary count signals offset by 90° of phase and it is preferably arranged in the hydraulic line which is used for opening the armature 1.1.

By the use of two pulse signals offset by 90° in relation to each other, the flow direction of the hydraulic fluid can be recognized using the series of pulses. In the program of the control module 6, using a directional logic the flow direction of the fluid is recognized as opening or closing travel direction. The difference between feed and return in the hydraulic line 2 results substantially by means of the direction of rotation of the wheel in the throughflow sensor 5 and by means of the recognition of the direction of rotation at the pulse counter, as to whether it rotates to the right or to the left.

When the hydraulic line 2 is switched to be the pressure-conducting feed line and the hydraulic fluid flows towards the armature unit 1, due to the compressibility of the hydraulic fluid in the feed line a higher number of pulses occurs than in the return flow via the same displacement travel of the piston 1.21 when the hydraulic line 2 is switched to be the pressureless return line. In this way, by means of the program present in the control module 6, the compressibility and the compression volume of the hydraulic fluid can be subtracted out using the different number of pulses.

The switch position of the switch valve 7 in FIG. 1 is represented in the middle position in which both hydraulic lines 2 and 3 are connected to the return line T leading to the reservoir and are therefore switched to be pressureless. In the right-hand position of the switch valve 7 shown schematically in FIG. 1, the hydraulic line 3 is connected to the pressure-conducting feed line P and the hydraulic line 2 is connected to the pressureless return line T, while in the position shown schematically on the left in FIG. 1, the hydraulic line 2 is connected to the feed line P and the hydraulic line 3 is connected to the return line T. The fluid lines T and P are designated as common fluid supply lines for all control units 4 to 4.*n*.

FIG. 2 schematically shows a hydraulic circuit wherein, in the control station 40, a plurality of control units 4 to 4.*n* each having a switch valve 7 and a control module 6 are connected to the fluid supply lines P and T in a manner corresponding to the representation in FIG. 1, in order to control a corresponding number of armature units 1 to 1.*n*.

A hydraulic means 8 having a pressure limiting valve 8.1 is connected, via return valves 8.2 and 8.3, to the supply lines P and T common to all the switch valves 7. On the inlet side, the pressure limiting valve 8.1 is connected, via a branch line P2 and the return valve 8.2, to the feed line P, wherein the return valve 8.2 unblocks the feed line P to the pressure limiting valve 8.1 and blocks the branch line P2 in the opposite direction. Furthermore, the pressure limiting valve 8.1 is connected on the inlet side to the pressureless return line T via a branch line T2 and the return valve 8.3, wherein the return valve 8.3 opens by means of the pressure from the pressure limiting valve 8.1 and blocks the branch line T2 in the opposite direction. On the outlet side, the pressure limiting valve 8.1 is connected to a portion Tv of line in which a pre-given pressure of, for example, 4 bar is maintained, and which is connected to the branch lines T1 of the return line T which lead to the switch valves 7 (FIG. 1).

In the line portion Tv, the pressure limiting valve 8.1 maintains a pre-determined fluid pressure which can be monitored, for example, by a pressure display indicated by 8.4. The line portion Tv in each case is connected to the branch line T1 between switch valve 7 and pressureless return line T by means of a return valve 7.1, which is set to an opening pressure of, for example, 0.2 bar. A return valve 7.2 is disposed in the branch line T1 between central return line T and the connection point of the line portion Tv, which return valve 7.2 can be set, for example, to an opening pressure of 5.0 bar and which, on depressurisation of the feed line 2 or 3 in each case, unblocks the connection from the switch valve 7 to the return line T until the preload pressure is reached.

Through the means 8, when the switch valve 7 is in the shown middle position in which the two hydraulic lines 2 and 3 are switched to be "pressureless" or "depressurised", at this switch valve 7 a pressure of for example 4 bar is maintained in the two hydraulic lines 2 and 3 as a preload pressure, which is set by the pressure limiting valve 8.1 in the line portion Tv. In other words, a preload pressure of, for example, 4 bar always acts on the switch valve 7 when one of the two hydraulic lines 2 and 3, or the two hydraulic lines, is or are connected to the central return line T.

The line portion Tv is connected in FIG. 2 to all switch valves 7 in the control units 4 to 4.*n*, wherein each connection point is constructed in the same manner as shown in FIG. 1.

By means of the maintenance of a preload pressure of, for example, 4 bar at the switch valve 7 during pressureless-switching of one or both hydraulic lines 2, 3, pressure pulses which occur during switching of the switch valve 7 are separated from the common return line T and damped such that they cannot have any effect at an adjacent switch valve 7 and thus at the adjacent pulse counter 5 and thus cannot influence the indication of position at the allocated control module 6. In this way, in the case of a plurality of control units 4 to 4.*n* connected in parallel, the exactness of the indication of position based on the counting of pressure pulses is increased.

Furthermore, to increase the exactness of the indication of position, preferably before each start-up of the indication of position a learning cycle is carried out, by means of which the basic components for the indication of position are detected before an actuating step, so that the following displacement of the armature, especially when reaching an intermediate position, can be exactly displayed. The program provided in the control module 6 preferably triggers a learning cycle on each start-up of the indication of position and on switching-on of the control module.

By means of such a learning cycle, the essential parameters for the indication of position, such as the pressure in the hydraulic lines which strongly influences the compressibility of the pressure medium or of the hydraulic liquid, or the temperature of the hydraulic liquid during the indication of position, are taken into account and the effect of these parameters is eliminated.

Further, by means of such a learning cycle, the control module 6 is calibrated. Hereby, the control module 6 detects the working volume of the connected armature, various compression volumes and the running time of the piston in the cylinder 1.2.

Preferably, the following method steps are carried out for a learning cycle by a program provided in the control module 6. FIG. 3 schematically shows the steps of the learning cycle described below.

In a first step C1 of the learning cycle, the armature and the piston 1.21 in the cylinder 1.2 are moved by the application of pressure in the hydraulic line 3 into the closed position, in which the flap provided in the armature 1.1 closes off the conduit (not shown) in the closed position and abuts at the armature body as a stop, so that no throughflow can occur in the hydraulic line 2. This stop position of the armature 1.1 is registered as a counter standstill, which is equivalent to a reference value of 0% in the program.

Hereby, as FIG. 3 shows, the hydraulic line 3 is subjected to pressure, and the hydraulic line 2, in which the throughflow sensor 5 is positioned as a pulse counter, is connected to the return line T and to the line portion Tv, so that the piston 1.21 in the cylinder is moved into the end position shown by way of example on the right, which corresponds to the stop position of the flap.

A counting of the pulses at the throughflow counter 5 does not yet take place thereby.

After the first step C1, in which the hydraulic line 3 was connected to the feed line P and the hydraulic line 2 was connected to the return line T and the branch line T1, in a second step C2 the two hydraulic lines 2 and 3 are switched to be "pressureless" by means of the switch valve 7 being displaced into the middle position, in which the two hydraulic lines 2 and 3 are connected to the branch line T1 of the return line T. This switched state is likewise registered by means of the digital throughflow counter 5 not outputting any pulses. This means that, in the middle position of the switch valve 7, the same pressure state and preload pressure is maintained in both hydraulic lines 2 and 3, which is set at a level of, for example, 4 bar by the means 8. The flap provided in the armature 1.1 is not actuated hereby. It is maintained in its position by the return valves 1.3.

In a third step C3, the armature 1.1 is moved into the fully open position by means of the pressure medium line 2 being subjected to pressure and the pressure medium line 3 being connected to the return line T, wherein the reaching of the open position, shown in FIG. 3, in which the piston 1.21 abuts at the left end of the cylinder 1.2, is registered by means of no throughflow being registered and no pulses being output at the throughflow counter 5.

In this third step C3, the pulses occurring at the throughflow counter 5, which occur between the closed position in C2 and the open position in C3, are counted for the first time. For the fully open position corresponding to C3, one can provide for example a stop in the armature 1.1.

In this third step C3, the pulses are counted which are output from the throughflow counter 5 from the closed position (0%) up to fully reaching the open position, wherein the number of pulses in the open position is equivalent to a reference value of 100%. The number of detected pulses corresponds to the displacement volume of the armature 1.1 and to the displaced volume of the piston 1.21 in the cylinder 1.2 including the compression volume of the hydraulic liquid, which is compressed on reaching the open position in the cylinder 1.2 and in the hydraulic line 2 leading to the cylinder. Hereby, at a maximum pressure of, for example, 110 bar, the maximum compression of the hydraulic liquid is achieved, because the flap in the armature 1.1 is pressed against a stop by the piston 1.21 in the cylinder 1.2.

In a fourth step C4, at the switch valve 7 again the middle position is reached, in which the previously pressure-conducting hydraulic line 2 is depressurised. Hereby, the pulses occurring during the depressurisation of the hydraulic liquid in the hydraulic line 2 are counted, the number of which corresponds to the compression volume which occurs in the cylinder 1.2 and in the hydraulic line 2. Preferably, a pre-determined waiting time of, for example, 2 seconds is set, so that the standstill of the throughflow counter 5 is reliably detected in each case.

In a fifth step C5, the armature 1.1 is again moved into the closed position by the pressure application of the hydraulic line 3, until the counter standstill and thus the reference value of 0% is reached. Hereby, the throughflow through the throughflow counter 5 is in the opposite direction to step C3, as FIG. 3 shows, wherein the number of pulses occurring thereby is counted by the throughflow counter 5, which corresponds to the displacement volume of the armature and of the cylinder 1.2.

Thus, by calculating the difference in the pulse numbers from C3−C5=C4, it is possible to check the compression volume which was detected in step C4.

In a sixth step C6, as in the second step C2, the middle position is set at the switch valve 7 and waiting takes place until no pulses occur at the throughflow counter 5, that is, no throughflow is present.

In a seventh step C7, the armature 1.1 is set at an intermediate or open position of, for example, 30% of the flap position, wherein, in order to reach this intermediate position there is a smaller application of pressure from the feed line P at the piston 1.21 in the cylinder 1.2, because in the case of relatively low resistance, the piston 1.21 is only displaced but is not pressed against a stop. The pulses occurring at the throughflow counter 5 in the case of this smaller pressure are counted. Due to the smaller pressure, a smaller compression of the hydraulic liquid in the hydraulic line 2 occurs, so that the number of pulses for this 30%-open and intermediate position represents the displacement volume of the armature and of the cylinder 1.2 in this intermediate position and the compression volume in the case of this smaller pressure.

In an eighth step C8, the middle position at the switch valve 7 is again reached as in the fourth step C4, wherein the return valves 1.3 at the armature 1.1 hold the pivoted position of the flap in the 30% position. The pulses occurring during the depressurisation of the hydraulic line 2, which was previously subjected to pressure, are counted, which give the compression volume for the smaller displacement pressure in step C7 which was contained in the count value when reaching the 30% open position.

In a ninth step C9, the armature 1.1 is again moved into the closed position as in the fifth step C5, while the number of pulses in the return line 2 is detected, which corresponds to the displacement volume of the armature 1.1 in the 30%-open position.

Before the armature is moved into the required position, in a tenth step C10 the middle position of the switch valve 7 is again reached. From the middle position, by means of pressure application of the hydraulic line 2 or 3, the piston 1.21 in the cylinder 1.2 is brought into the required operating position, into which the armature 1.1 is ultimately to be brought.

The step C10 represents an initial position for the real positioning of the armature after the carrying out of the learning cycle. When the armature is to be set to, for example, 50% open position, then after the performing of the learning cycle following the step C10, 50% open position is set at the control module 6, whereupon from the whole displacement volume of the armature known from step C5, 50% is calculated in the form of the number of pulses for 50% plus the compression volume for an intermediate position known from the step C8, wherein from the number of pulses known from step C8 it can be calculated how large the compression volume for, for example, 10% of the piston travel is, so that for the 50% open position to be set, the compression volume of 5×10% can be calculated from the step C8.

In the steps C7 to C9, the compression volume is detected for a small pressure which occurs in the feed line when reaching an intermediate position of the armature after no resistance such as a stop for the piston 1.21 is present when reaching an intermediate position. In the steps C3 and C4, the compression volume in the case of maximum pressure is detected.

By means of this learning cycle through which, for one thing, the compression volume in the case of maximum pressure (steps C3 and C4) and, for another, the compression volume in the case of smaller pressure (steps C7 and C8) is detected which occurs when reaching an intermediate position, an exact representation of the position of the armature and of the piston 1.21 in the cylinder 1.2 is always displayed. Because in each case during start-up of the indication of position the learning cycle is carried out before the armature 1.1 is set at a determined position, the position is always exactly displayed, independently of how often and how long the armature is in operation.

By means of this learning cycle, preferably before each pressure application of the piston 1.21 in the cylinder 1.2 the two hydraulic lines 2, 3 are switched, by means of the middle position of the switch valve 7, to be pressureless and depressurised, wherein the pulses occurring during depressurisation can be counted. By means of depressurising the hydraulic lines 2, 3 before each pressure application in the cylinder 1.2, a neutral initial situation is achieved which does not distort the number of pulses during a following step.

The control module 6, which is formed for example block- or plate-shaped, can have dimensions of, for example, approximately 3×10×10 cm. FIG. 4 shows a view of the front end of an exemplary embodiment of a control module 6, which carries out the learning cycle described above and at which the required settings can be carried out.

FIG. 4 shows a display 6.1, for example in the form of two 7-segment displays arranged over one another, which display the present position of the armature 1.1 and of the piston 1.21 in the cylinder 1.2 and further status information. Reference signs 6.2 and 6.3 designate switches. Reference sign 6.4 designates a set-position sensor through which a calibration function can be started. This set-position sensor 6.4 is preferably protected from unintended actuation by a transparent cover. The control module 6 is calibrated after installation, wherein by means of a calibration run corresponding to the steps in FIG. 3, the control module 6 calculates all drive- and installation-dependent parameters, which are permanently stored in a memory.

Reference sign 6.5 shows three LED lights in, for example, red, yellow and green, which display the operating state of the cylinder 1.2 and of the control module 6. The two outer LEDs can be used for the indication of position, while the middle LED can serve to display the operating state of the control module 6.

Reference signs 6.6 and 6.7 designate clamps on opposite sides of the control module 6, at which among other things the throughflow counter 5, the power supply thereof, the connections at the solenoid valves a, b of the switch valve 7 and the like can be connected.

This control module 6 having the program for carrying out the learning cycle can be used for different large armatures and different displacement volumes of armatures, without an adaptation to a determined armature or to a determined dimensioning of the hydraulic lines having to be made at the control module 6.

Existing systems can also be equipped with such a control module 6 for the indication of position.

Different variations and modifications of the method described are possible. For example, during step C9, in which the return volume and the displacement volume in an intermediate position of the armature is detected by counting the pulses occurring, at for example 10% of the adjustment travel the piston 1.21 in the cylinder 1.2 can be stopped again, in order to detect the compression volume in the hydraulic line switched to be the feed line and that switched to be the return line. This can be provided for error correction.

As the program present in the control module 6 includes not only all the parameters of the armature unit 1 and the control system, but also due to the detected count values the displacement volume of the cylinder 1.2 and compression volume in the different switched states, these data and pulse numbers can be analysed in different ways, wherein the learning cycle in FIG. 3 represents a preferred embodiment.

The method described and the device described can be used not only for tank ships, but also for industrial plants such as refineries and the like, in which armatures at conduits have to be actuated and controlled from a distant control station.

Thus the invention can be used in various ways in order to eliminate compression influences during the indication of position of a hydraulically actuated armature.

The invention claimed is:

1. Method for indicating a position of a hydraulically actuated armature, having a cylinder (1.2) for actuating the armature (1.1) which is connected by means of two hydraulic lines (2, 3) to a switch valve (7) through which the hydraulic lines can be switched between pressure-conducting feed flow and pressureless return flow, wherein the flow of the hydraulic fluid flowing through one of the hydraulic lines is converted into a number of electric pulses, each of which pulses corresponds to a pre-determined unit of volume of the hydraulic fluid, the switch valve (7) is connected to supply lines (P, T), to which further switch valves (7) are connected for actuating further armatures (1.*n*), and the switch valves (7) are connected via a branch line (T1) to the return line (T) common to all armatures (1.1 to 1.*n*), characterised in that
  at each switch valve (7) in the branch line (T1) to the return line (T), a preload pressure is maintained which is higher than the pressure in the common return line (T).

2. Method for indicating a position of a hydraulically actuated armature, having a cylinder (1.2) for actuating the armature (1.1) which is connected by means of two hydraulic lines (2, 3) to a switch valve (7) through which the hydraulic lines can be switched between pressure-conducting feed flow and pressureless return flow, wherein
  the flow of the hydraulic fluid flowing through one of the hydraulic lines is converted into a number of electric pulses, each of which pulses corresponds to a pre-determined unit of volume of the hydraulic fluid,
  the switch valve (7) is connected to supply lines (P, T), to which further switch valves (7) are connected for actuating further armatures (1.*n*), and
  the switch valves (7) are connected via a branch line (T1) to the return line (T) common to all armatures (1.1 to 1.*n*),
characterised in that
  at each switch valve (7) in the branch line (T1) to the return line (T), a preload pressure is maintained which is higher than the pressure in the common return line (T), wherein
  by means of a hydraulic means (8) connected to the two supply lines (P, T), the preload pressure in a line portion (Tv) is maintained, to which all switch valves (7) are connected.

3. Method for indicating a position of a hydraulically actuated armature, having a cylinder (1.2) for actuating the armature (1.1) which is connected by means of two hydraulic lines (2, 3) to a switch valve (7) through which the hydraulic lines can be switched between pressure-conducting feed flow and pressureless return flow, wherein the flow of the hydraulic fluid flowing through one of the hydraulic lines is converted into a number of electric pulses, each of which pulses corresponds to a pre-determined unit of volume of the hydraulic fluid,
  the switch valve (7) is connected to supply lines (P, T), to which further switch valves (7) are connected for actuating further armatures (1.*n*), and
  the switch valves (7) are connected via a branch line (T1) to the return line (T) common to all armatures (1.1 to 1.*n*),
characterised in that
  at each switch valve (7) in the branch line (T1) to the return line (T), a preload pressure is maintained which is higher than the pressure in the common return line (T), wherein
  a preload pressure in the order of magnitude of 3 to 5 bar is B maintained at the switch valves (7).

4. Device for displaying a position of a plurality of hydraulically actuated armatures (1.1 to 1.*n*), each of which has a cylinder (1.2) for actuating the armature, which cylinder is connected by means of two hydraulic lines (2, 3) to a switch valve (7) through which the hydraulic lines can be switched between pressure-conducting feed flow and pressureless return flow, and a pressure medium sensor (5) is provided in one of the two hydraulic lines, which converts the flow of the hydraulic fluid flowing through the hydraulic line into a number of electric pulses, each of which corresponds to a pre-determined unit of volume of the hydraulic fluid, characterised in that
  a hydraulic means (8) is connected to supply lines (P, T), to which all switch valves (7) are connected, and the hydraulic means (8) maintains a preload pressure in relation to the pressure in the common return line (T) in a line portion (Tv) to which all switch valves (7) are connected.

5. Device for displaying the position of a plurality of hydraulically actuated armatures (1.1 to 1.*n*), each of which has a cylinder (1.2) for actuating the armature, which cylinder is connected by means of two hydraulic lines (2, 3) to a switch valve (7) through which the hydraulic lines can be switched between pressure-conducting feed flow and pressureless return flow, and a pressure medium sensor (5) is provided in one of the two hydraulic lines, which converts the flow of the hydraulic fluid flowing through the hydraulic line into a number of electric pulses, each of which corresponds to a pre-determined unit of volume of the hydraulic fluid, characterised in that a hydraulic means (8) is connected to supply lines (P, T), to which all switch valves (7) are connected, and the hydraulic means (8) maintains a preload pressure in relation to the pressure in the common return line (T) in a line portion (Tv) to which all switch valves (7) are connected, wherein
  the hydraulic means (8) has a pressure limiting valve (8.1) and return valves (8.2, 8.3) between the pressure limiting valve and the supply lines (P, T).

* * * * *